United States Patent
Murphy et al.

(10) Patent No.: US 9,708,912 B2
(45) Date of Patent: Jul. 18, 2017

(54) TURBINE ROTOR NUT AND BOLT ARRANGEMENT WITH IMPROVED FATIGUE RESISTANCE UNDER CENTRIFUGAL LOAD

(71) Applicant: Siemens Energy, Inc., Orlando, FL (US)

(72) Inventors: Ryan Murphy, Gastonia, NC (US); Kevin M. Light, Maitland, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 321 days.

(21) Appl. No.: 14/527,935

(22) Filed: Oct. 30, 2014

(65) Prior Publication Data
US 2016/0123161 A1    May 5, 2016

(51) Int. Cl.
| F01D 5/06 | (2006.01) |
| F16B 31/06 | (2006.01) |
| F16B 37/00 | (2006.01) |

(52) U.S. Cl.
CPC .............. *F01D 5/066* (2013.01); *F16B 31/06* (2013.01); *F16B 37/00* (2013.01); *F05D 2250/232* (2013.01); *F05D 2260/941* (2013.01)

(58) Field of Classification Search
CPC ................................ F16B 5/0241; F16B 31/06
USPC ......................................................... 411/427
See application file for complete search history.

(56) References Cited

U.S. PATENT DOCUMENTS

| 2,059,853 A * | 11/1936 | Daiber .................... F16B 31/06 411/369 |
| RE26,469 E * | 10/1968 | Beltoise .................. F16B 37/02 411/156 |
| 4,005,740 A | 2/1977 | Villo et al. |
| 4,828,441 A | 5/1989 | Frasca |
| 5,295,773 A | 3/1994 | Amoroso |
| 5,779,416 A * | 7/1998 | Sternitzky ............... F16B 31/06 411/411 |
| 5,860,779 A * | 1/1999 | Toosky .................... F16B 39/28 411/178 |
| 5,927,921 A * | 7/1999 | Hukari .................... F16B 31/06 411/186 |
| 6,641,326 B2 | 11/2003 | Schilling et al. |
| 7,296,957 B2 * | 11/2007 | Walter .................. F16B 33/002 411/113 |
| 8,038,377 B2 | 10/2011 | Ichiryu |
| 2003/0007844 A1 * | 1/2003 | Terry .................... F16B 39/282 411/186 |

FOREIGN PATENT DOCUMENTS

| JP | 2001-065586 | 3/2001 |
| JP | 2002349529 A * | 12/2002 |

OTHER PUBLICATIONS

Full English translation of JP 2001065586A.*

* cited by examiner

*Primary Examiner* — Woody Lee, Jr.
*Assistant Examiner* — Topaz L Elliott

(57) ABSTRACT

A gas turbine engine rotor (14), including: a rotor disk (16) comprising a bolt hole (82) there through and a counterbore (86); a bolt (18) configured to fit in the bolt hole and when so disposed to define an end (72) protruding beyond the counterbore; and a nut (84) configured to be disposed in the counterbore and to engage the protruding end. The counterbore is configured to permit limited eccentricity between the nut and the protruding end.

17 Claims, 4 Drawing Sheets

TURBINE ROTOR NUT AND BOLT ARRANGEMENT WITH IMPROVED FATIGUE RESISTANCE UNDER CENTRIFUGAL LOAD

FIELD OF THE INVENTION

The present invention relates generally to the field of power generation, and more particularly to a gas turbine engine rotor, and specifically to a turbine rotor having a nut and bolt arrangement subjected to centrifugal forces acting orthogonal to a fastening direction.

BACKGROUND OF THE INVENTION

Gas turbine rotors may include several stages of rotor disks secured together with a stud (e.g. a bolt) and a nut. When spinning at high speed the weight of the nut results in a large amount of centrifugal force which must be reacted by the bolt threads. The centrifugal load can also impart an eccentricity between the bolt threads and the nut threads. Thus, the first engaging thread of the bolt, which bears most of the load in a standard nut and bolt configuration, experiences a circumferentially localized increase in load when spinning. If this effect is not, accounted for in the design of the nut and bolt it may reduce a life cycle of the nut and bolt arrangement.

Various attempts have been made to reduce the localized stress on the first engaging thread, many of which involve complicated manufacturing processes. Most of these are not specific to gas turbine engines. U.S. Pat. No. 8,038,377 to Ichiryu discloses a fastening device for a gas turbine engine rotor where the center of gravity of the nut is disposed in a nut hole (counterbore) and the nut is held concentric to the bolt to improve the axial and circumferential load distribution on the threads. However, in some configurations it is not possible to countersink the nut to this extent. Consequently, there remains room in the art for improvement.

BRIEF DESCRIPTION OF THE DRAWINGS

The invention is explained in the following description in view of the drawings that show.

DETAILED DESCRIPTION OF THE INVENTION

The present inventors have devised an innovative, inexpensive, and easy to manufacture nut and bolt arrangement that provides for a more even axial and circumferential distribution of loads on engaged threads when the nut and bolt are subjected to forces that act orthogonally to a fastening direction. The nut and bolt arrangement is particularly well suited for securing gas turbine engine rotor disks together when the nut cannot be substantially countersunk into the rotor. During operation the spinning of the rotor creates centrifugal forces that act on the nut and an end of the bolt that protrudes from the rotor disk. In a conventional and static nut and bolt arrangement the bolt's reactionary load is borne primarily by the first thread and the stress is essentially uniform circumferentially along the first engaging thread. In a spinning arrangement the centrifugal forces act to push the nut orthogonal to the fastening direction, causing an eccentricity between the bolt threads and the nut threads, and creating a bending moment on the protruding end of the bolt. The increase in force on the first engaging bolt thread, the change in direction of the force on the first engaging bolt thread, and a change in how the nut and bolt threads contact each other caused by the eccentricity all work together to locally increase stress on an inboard side (with respect to the axis of rotation of the rotor) of the first engaging bolt thread. The nut and bolt arrangement disclosed herein is configured to more evenly distribute the circumferential and axial stresses on the engaging threads.

Figure 1:
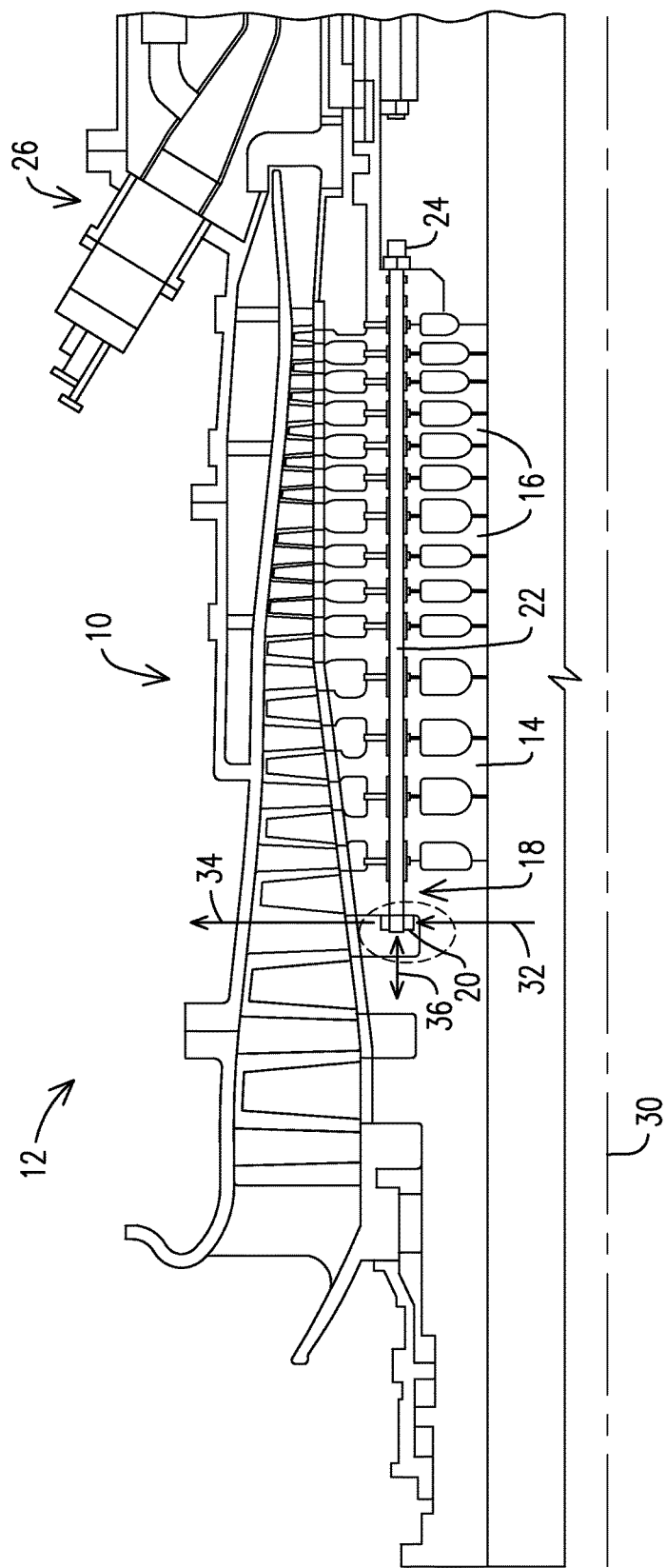
FIG. 1 is a sectional view of a gas turbine engine compressor showing a prior art nut and bolt arrangement.

FIG. 1 shows a portion of a compressor 10 of a gas turbine engine 12, and a rotor 14 composed of several rotor disks 16 secured together with a prior art nut and bolt arrangement 18. A prior art nut 20 is disposed on the bolt 22 at a cold end of the compressor 10, while a downstream end 24 of the bolt is disposed closer to the turbine combustors 26. The downstream end 24 may be secured by any means known to those in the art, including a second nut etc. During operation the rotor 14 rotates about a rotor axis of rotation 30 and this creates a centrifugal force 32 that urges the prior art nut 20 in a radially outward direction 34 (with respect to the rotor axis of rotation 30) orthogonal to a fastening direction 36. This urging results in a minor radial (lateral) movement of the prior art nut 20 with respect to the bolt 22, causing an eccentricity between the prior art nut 20 and the bolt 22. When frictional forces between the prior art nut 20 and the bolt 22 are overcome, the radial movement is stopped when the prior art nut 20 and the bolt 22 bottom-out on each other. Bottoming out occurs when the prior art nut 20 can no longer move radially with respect to the bolt 22 due to their mechanical interaction without elastic or plastic deformation of the threads. For example, when flanks on both sides of one nut thread meet flanks on both sides of an associated bolt thread, or when a peak of the nut thread meets a valley of the bolt thread etc.

Figure 2:
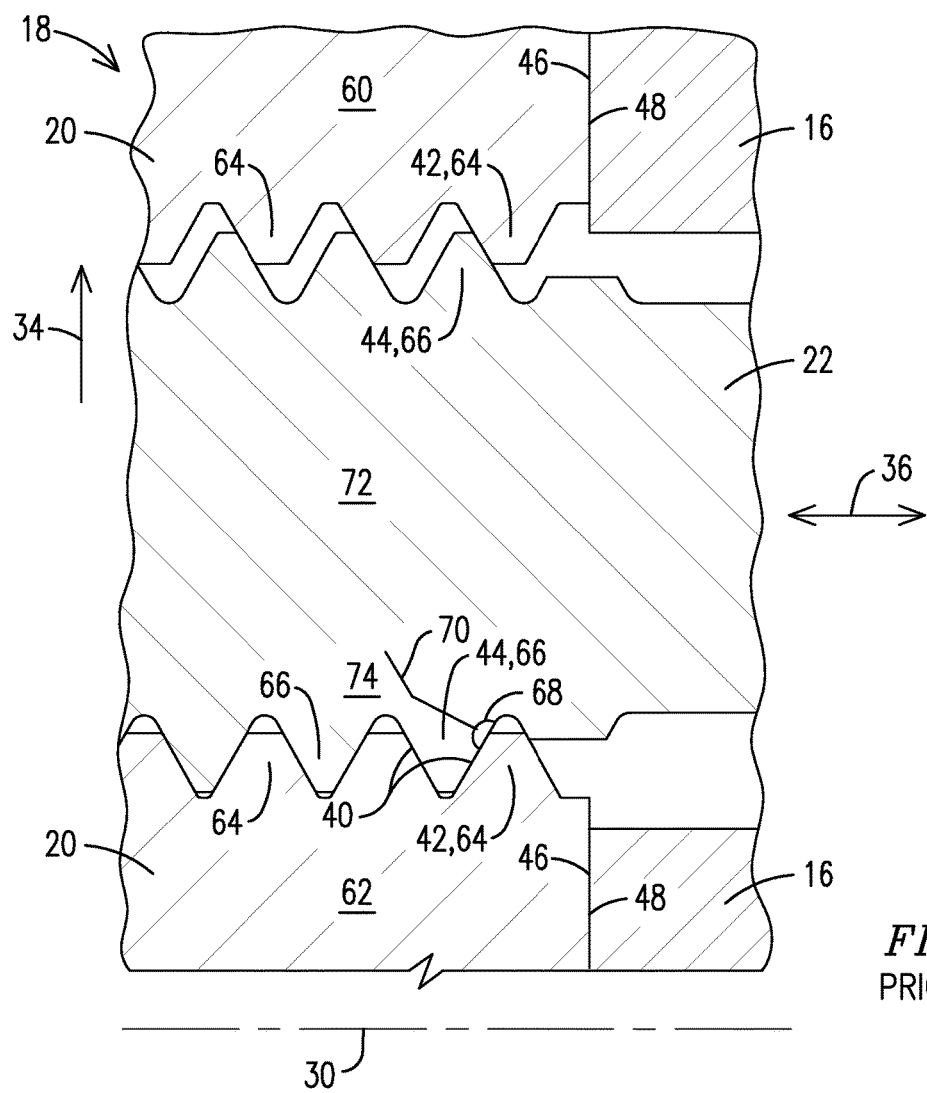
FIG. 2 is a sectional view of the prior art nut and bolt arrangement of FIG. 1 when experiencing centrifugal forces that occur during spinning of the rotor.

FIG. 2 is a representation of the prior art nut 20 and bolt 22 of FIG. 1 when experiencing the centrifugal forces acting orthogonal to the fastening direction 36. The prior art nut 20 has bottomed out against the bolt 22 due to a geometric relationship between a flank 40 on a first engaging thread 42 of the prior art nut 20, a flank 40 on a first engaging thread 44 of the bolt 22, and an interaction between a load face 46 of the prior art nut 20 and a load face 48 of the rotor disk 16. As shown in FIG. 2 and referred to herein, a top dead center (TDC) 60 and a bottom dead center (BDC) 62 of the nut are circumferential locations referring to a part of the prior art nut 20 farthest from the rotor axis of rotation 30 and a part of the prior art nut 20 nearest the rotor axis of rotation 30 respectively. At the BDC 62, nut threads 64 are being forced into bolt threads 66, causing a maximum lateral engagement locally between the threads. At the TDC 60, nut threads 64 are separated from bolt threads 66, causing a reduced lateral engagement locally between the threads.

The centrifugal forces present when the prior art nut 20 and bolt 22 are bottomed out cause a local concentration of high stresses at a high stress location 68 in the first engaging thread 44 of the bolt 22. Since fatigue failures are the result of a material experiencing sufficient stress over time, and since the stresses in the high stress location 68 are relatively high, the fatigue life of the bolt 22 may be controlled by the fatigue life of the high stress location 68 in the prior art nut and bolt arrangement 18.

As a result of the centrifugal forces and the wedging action resulting from a bottomed-out geometry, a crack 70 may initiate at the high stress location 68, and may propagate throughout the bolt 22 as shown. The crack propagation may be aided by the nut 20 as the centrifugal forces essentially peel the prior art nut 20 around a tip 72 of the bolt 22 that protrudes beyond the load face 48 of the rotor disk 16. A conventional bolt 22 may be, for example, up to ten feet long, or even longer, and may be up to 3.5 inches, or larger, in diameter. A liberated prior art nut 20 and portion 74 of the tip 72 therein thus represent considerable momentum and can cause damage within the gas turbine engine. Consequently, the inventors have devised the nut and bolt arrangement disclosed herein that is effective to better distribute the stresses circumferentially along each thread as well as among all the threads. This may increase the fatigue life of the nut and bolt arrangement.

Figure 3:
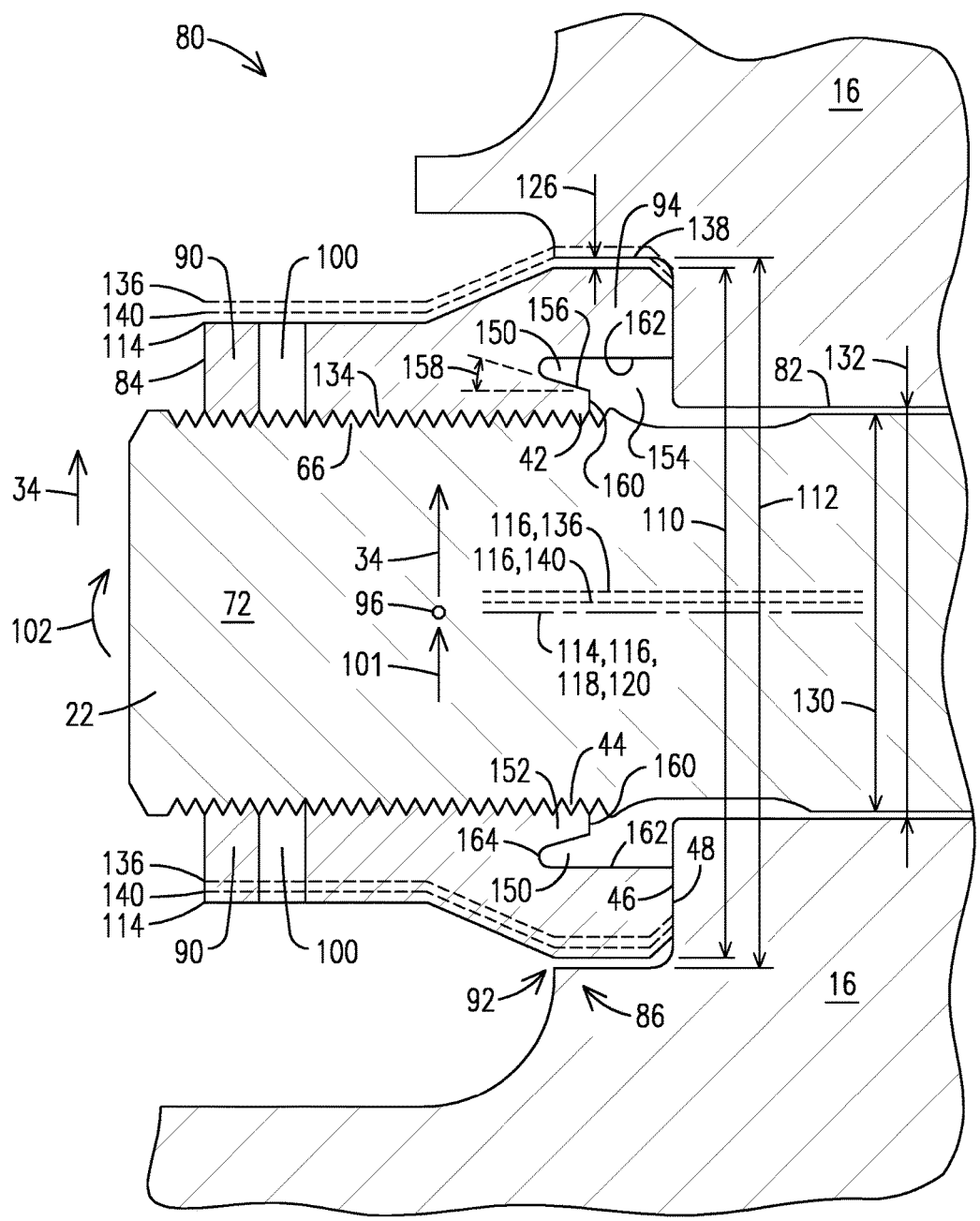
FIG. 3 is a sectional view of the nut and bolt arrangement disclosed herein.

FIG. 3 shows a nut and bolt arrangement 80 having a bolt 22 disposed in a bolt hole 82, a nut 84 secured to the bolt 22 and partly disposed within a counterbore 86 in a rotor disk 16. The nut 84 further includes a nut protruding end 90 that protrudes from the counterbore 86, past an outer end 92 of the counterbore 86. Both a nut face end 94 and the nut protruding end 90 may have cylindrical outer diameters to minimize the amount or material present in the nut 84 and the associated forces. As a result of the protrusion of the nut 84, a center of gravity 96 of the nut 84 may rest outside the counterbore 86. Radial nut holes 100 may be used to reduce weight and/or receive a tool (not shown) to enable assembly of the nut 84 onto the bolt 22. As shown the radial nut holes 100 are through-holes. Alternately, they may be partial (blind) holes formed from the outer surface toward, but not reaching, the nut threads 134.

Centrifugal forces 101 act on the center of gravity 96 of the nut 84 and create the nut bending moment 102 that the bolt 22 and associated bolt threads 66 must react. It is the radial centrifugal forces 101 and nut bending moment 102 and associated wedging action resulting from a bottomed-out geometry that cause the high stress location 68 in the prior art, but which is mitigated and/or eliminated using the nut and bolt arrangement 80 herein.

The nut face end 94 has a face end outer diameter 110. The counterbore 86 has a counterbore inner diameter 112. As shown the nut 84 is concentrically positioned within the counterbore 86 to form a fully concentric configuration 114 where a nut longitudinal axis 116, a bolt longitudinal axis 118, and a bolt hole longitudinal axis 120 are the same. A tolerance stacking between an outer diameter 130 of the bolt 22 and an inner diameter 132 of the bolt hole 82 may permit the bolt 22 to move laterally in the radially outward direction 34 with respect to the bolt hole 82. A tolerance stacking between nut threads 134 and bolt threads 66 may permit the nut 84 to move laterally in the radially outward direction 34 with respect to the bolt 22. If not laterally constrained, these tolerances would permit the nut 84 to move in the radially outward direction 34 until the nut 84 bottomed out into a bottomed out configuration 136 such as occurs in the prior art where there is no counterbore.

The counterbore inner diameter 112 used in the nut and bolt arrangement 80 is uniquely configured to be an optimized dimension that is larger than the face end outer diameter 110. This is done to permit a limited amount of eccentricity, but to prevent a bottomed out configuration 136. When the nut 84 moves radially/laterally and abuts a counterbore side wall 138, the nut 84 reaches a maximum permitted eccentricity configuration 140. The exact amount of a gap 126 desired between the face end outer diameter 110 and the counterbore inner diameter 112 when the nut and bolt arrangement 80 is in the fully concentric configuration 114 will depend on the tolerances between the nut 84 and the bolt 22, the bolt 22 and the bolt hole 82, the amount of deflection the tip 72 of the bolt 22 expected during operation resulting from the centrifugal forces on the tip 72 and the nut 84, and the thread parameters etc. The gap may also account for a dilation (increase in diameter) of the nut 84 due to fastening forces that may axially com-press the nut. By controlling the amount of permitted eccentricity, the amount of contact area between the nut threads 134 and the bolt threads 66 at the TDC 60 and the nut threads 134 and the bolt threads 66 at the BDC 62 can be adjusted. Since stress is a result of force and area, adjusting the contact area permits the inventors to distribute the stress in the nut threads 134 and the bolt threads 66 circumferentially (from BDC 62 to TDC 60).

In addition to circumferential distribution control, the nut and bolt arrangement 80 permits axial distribution of the stresses via a unique undercut 150 which is annular in shape and surrounds the first engaging thread 42 of the nut 84 and up to three or even more nut threads 134. The undercut 150 forms a unique conical section 152 within a nut counterbore 154 that includes a conical outer surface 156 that tapers inward at a taper angle 158 towards the nut threads 134, and a face end 160 setback axially a distance from the load face 46 of the nut 84. A nut counterbore inner surface 162 may meet the conical outer surface 156 and form a fillet 164 that extends around the circumference and hence has an annular shape. In the sectional view of FIG. 3 the undercut 150 takes on a cantilevered shape. This cantilevered shape offers less structural support to the first engaging thread 42 of the nut 84 as well as less support to any such cantilevered nut threads 134 relative to other nut threads 134 not disposed on the conical section 152. Consequently, any nut threads 134 on the conical section 152 are more readily axially and/or radially displaced. Permitting this axial displacement (via axial elastic deformation of the conical section 152) helps spread the forces and associated stresses from the first engaging thread 42 of the nut 84 to the adjacent nut threads 134. This, in turn, helps spread the forces and stressed experienced by the associated bolt threads 66.

Figure 4:
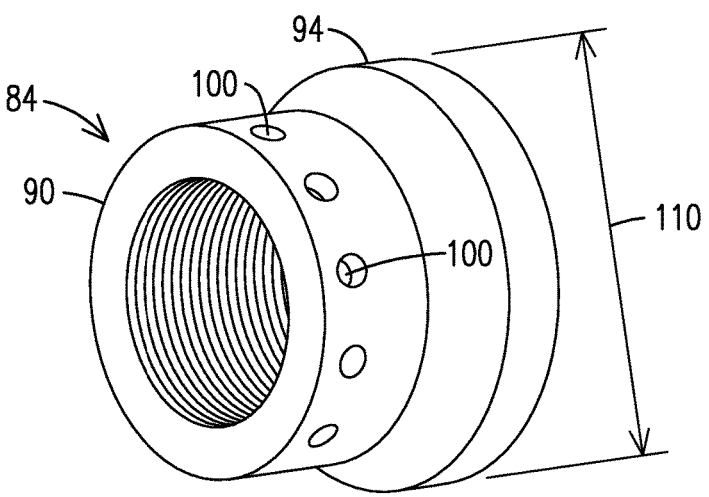
FIG. 4 is a perspective view of the nut of FIG. 4.

FIG. 4 is a perspective view of the nut 84 showing the nut protruding end 90, the nut face end 94, the radial nut holes 100, and the face end outer diameter 110.

Figure 5:
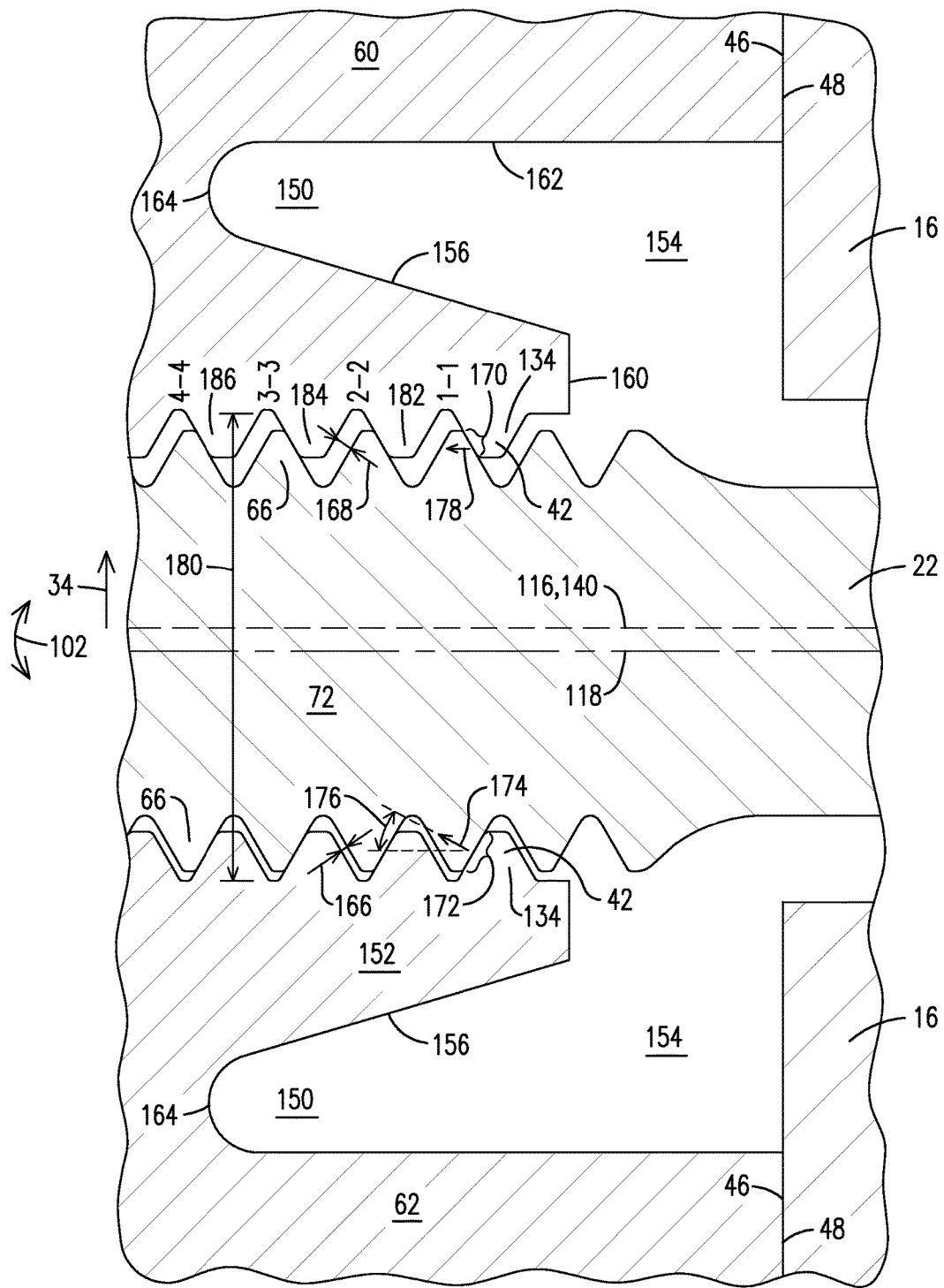
FIG. 5 is a partial sectional view of the nut and bolt arrangement of FIG. 4 when experiencing centrifugal forces that occur during spinning of the rotor.

FIG. 5 is a partial sectional view of the nut and bolt arrangement 80 experiencing the centrifugal forces 101 that occur during spinning of the rotor 14 (not shown). As shown the nut and bolt arrangement 80 is in the maximum permitted eccentricity configuration 140. The eccentricity can be seen by a difference in a BDC gap 166 between nut threads 134 and bolt threads 66 and a larger TDC gap 168 between nut threads 134 and bolt threads 66. This means that some eccentricity between the bolt longitudinal axis 118 and the nut longitudinal axis 116, and hence the bolt threads 66 and the nut threads 134, has been permitted due to the selected counterbore inner diameter 112 designed to be larger than the face end outer diameter 110. The tip 72 of the bolt 22 is essentially cantilevered from a remainder of the bolt 22 that is radially supported by the side wall of the bolt hole 82. Consequently, while not visible in FIG. 5, the tip 72 of the bolt 22 may also be deflected radially outward (upward in FIG. 5) due to the centrifugal forces acting on the tip 72 of the bolt. This may be exacerbated by the radial forces imparted on the tip 72 by the nut 84.

The amount of eccentricity is selected based on the various factors mentioned above and this includes optimizing circumferential thread contact areas to account for competing factors. Specifically, a TDC contact area 170 and a BDC contact area 172 can be optimized to provide an amount of contact area that is responsive to the loads at the respective areas. While the TDC 60 and the BDC 62 are discussed herein for sake of clarity, the concepts apply to the entire circumference of the nut threads 134 and the bold threads 66.

While rotating, at the BDC 62 the first engaging thread 42 of the bolt 22 must react an axial load 178 resulting from the fastening of the nut 84 with the bolt 22, a radial/lateral load resulting from the centrifugal forces 101 on the nut 84, and a bending moment load from the nut bending moment 102. A resulting BDC load 174 on the first engaging thread 44 of the bolt 22 may be at a BDC angle 176 from parallel with the bolt longitudinal axis 118. At the TDC 60 the first engaging thread 42 of the bolt 22 reacts with the axial load resulting from the fastening of the nut 84 with the bolt 22, and perhaps with a negligible bending load from the nut bending moment 102.

However, the centrifugal forces not only urge the nut 20 radially outward, but they also urge the cantilevered tip 72 of the bolt 22 radially outward (upward in FIG. 5). The remainder of the bolt 22 within the bolt hole 82 maintains its radial position because it is held in place by the bolt hole 82. As a result, the tip 72 of the bolt 22 can be envisioned as rotating slightly clockwise during operation as a result of its radially outward movement. This causes the bolt threads 66 at TDC 60 to shift slightly axially to the right, moving the bolt threads 66 toward the nut threads 134 at TDC 60. The amount of axial shift increases with the distance a given thread is located from an effective pivot point (not shown). Consequently, there may be more axial shift in third and fourth threads than in the first engaging threads 42, 44, for example. Simultaneously, as the nut 20 shifts, the nut threads 134 at TDC 60 disengage from the bolt threads 66. In contrast, the bolt threads 66 at BDC 62 shift slightly axially to the left, away from the nut threads 134 at BDC 62. Likewise, the amount of axial shift increases with the distance a given thread is located from an effective pivot point. Simultaneously, as the nut 20 shifts laterally, the nut threads 134 at BDC 62 increase engagement with the bolt threads 66.

In an arrangement where the nut 20 is prevented from any lateral movement and the tip 72 of the bolt 22 protrudes, the axial shift of the bolt threads 66 at TDC 60 of a deflecting tip 72 of the bolt may cause stresses at the TDC 60 to be greater than at BDC 62. In an arrangement where the nut 20 is unrestrained laterally and the tip 72 of the bolt 22 protrudes, the wedging effect of the bottomed out configuration 136 may cause the high stress location 68 at the BDC 62.

The inventors have recognized that stress locations vary depending on the configuration, and the nut and bolt arrangement 80 disclosed herein falls between not enough eccentricity (high stress at TDC 60), and too much eccentricity (high stress at BDC 62). In particular, the inventors have recognized that stresses can be distributed by striking a balance between several factors associated with increasing eccentricity, including: increasing axial shift of the bolt threads 66 at TDC 60 toward the right due to tip 72 rotation (increasing force at TDC 60); disengagement of the nut threads 64 from the bolt threads 66 at TDC 60 due to lateral nut 20 movement (decreasing force at TDC); decreasing TDC contact area 170 (tending to increase stress at TDC 60); increasing axial shift of the bolt threads 66 at BDC 62 to the left due to tip 72 rotation (decreasing force at BDC 62); deeper engagement of the nut threads 64 with the bolt threads 66 at BDC 62 due to lateral nut 20 movement (increasing force at BDC 62); increasing BDC contact area 172 (tending to decrease stress at BDC 62); and preventing the bottomed out configuration 136. Consequently, the inventors have recognized that by permitting a limited eccentricity they can tailor the TDC contact area 170 and the BDC contact area 172 of a particular nut and bolt arrangement 80 having certain parameters to match the magnitude of their respective loads on the bolt threads 66 for an expected set of operating conditions. The circumferential stress distribution permitted by permitting the limited eccentricity, together with the axial stress distribution permitted by the undercut 150, provide for much more evenly circumferentially and axially distributed stresses on the bolt threads 66. This, in turn, may extend the fatigue life of the bolt threads 66.

While in the maximum permitted eccentricity configuration 140 the nut threads 134 are also experiencing loads and stresses, as is the conical section 152. In one model, a peak axial load on the first engaging thread 42 of the bolt 22 was reduced by approximately fifty percent from the prior art. This load was transferred to the other bolt threads, such that the first engaging thread 42 of the bolt 22 experienced a load that was less than a load experienced by many adjacent bolt threads 66. In that model the load on the third and fourth threads was among the greatest of the bolt threads 66. This redistribution is transferred to the nut threads 134. In order to keep stress in the conical section 152 more uniform, an area of the conical section 152 associated with each nut thread 134 is also tailored to match the load of the associated nut thread 134. For example, a cross section 1-1 of the conical section 152, taken orthogonal to the nut longitudinal axis 116 and at a nut thread major diameter 180, is characterized by a 1-1 cross sectional area. Likewise, cone cross section 2-2, 3-3, and 4-4 are associated with respective threads and are characterized by respective cross sectional areas.

Since the load on the first engaging thread 42 of the nut 84 is relatively low, the cross sectional area of cross section 1-1 may be relatively low. On the other hand, since the load on a second nut thread 182, a third nut thread 184, and a fourth nut thread 186 increases, the respective cross sectional areas of sections 2-2, 3-3, and 4-4 may be larger to accommodate their respective greater loads. The cross sectional area of the various sections can be controlled by controlling the taper angle 158 of the conical outer surface 156 and a location of the conical outer surface. In this manner the stresses in the conical section 152 may be more evenly axially distributed. While it may be possible to circumferentially vary the shapes of the sections 1-1, 2-2, 3-3, and 4-4 to accommodate the circumferential variation in load, such as by permitting an eccentricity between an inner diameter and an outer diameter of the cross section, this may require burdensome machining and assembling methods.

From the foregoing it can be seen that the inventors have devised a clever, unique, and yet simple solution that can turn more uniformly distribute stresses in among the threads in a rotating nut and bolt arrangement that experiences uneven loads on the threads. Consequently, this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A gas turbine engine rotor, comprising:
a rotor disk comprising a bolt hole there through and a counterbore;
a bolt configured to fit in the bolt hole and when so disposed to define an end protruding beyond the counterbore; and
a nut configured to be disposed in the counterbore and to engage the protruding end, wherein the counterbore is configured to permit limited eccentricity between the nut and the protruding end, and
wherein the nut further comprises an annular undercut circumferentially surrounding and axially coincident with a first engaging thread and at least two more engaging threads,
wherein the undercut forms a cantilever including a tapered section forming a conical outer surface of the nut
wherein, in an installed state, a nut face end is in contact with a radial surface of the counterbore, and a cantilever face end is axially offset from the nut face end such that the cantilever is not in contact with the radial surface of the counterbore.

2. The gas turbine engine rotor of claim 1, wherein the counterbore is configured to prevent bottoming-out of bolt threads with nut threads.

3. The gas turbine engine rotor of claim 1, wherein the nut comprises a load face end configured to sit in the counterbore, and wherein an inner diameter of the counterbore is larger than an outer diameter of the load face end to permit the limited eccentricity.

4. The gas turbine engine rotor of claim 1, wherein the first engaging thread is set back from a load face of the nut.

5. The gas turbine engine rotor of claim 1, wherein the nut is configured to pro-vide less axial and radial support to the first engaging thread than to another thread, wherein the cantilevered shape of the undercut provides less axial and radial support to the first engaging thread than to another thread.

6. The gas turbine engine rotor of claim 1, wherein the nut protrudes from the counterbore when disposed in the counterbore.

7. A gas turbine engine rotor comprising a nut and bolt configured to secure plural rotor disks together, the nut comprising:
a cylindrical body;
a load face;
a recess from the load face;
a thread protrusion protruding into the recess toward the load face;
and a first engaging thread and at least two further engaging threads disposed on an inside surface of the thread protrusion,
wherein the recess includes a cantilevered shape including a tapered section forming a conical outer surface of the nut
wherein an end of the thread protrusion closest to the load face is set back from the load face, and
wherein in the installed state the thread protrusion is not in contact with the rotor disk.

8. The gas turbine engine rotor of claim 7, wherein the recess comprises an inner surface, the thread protrusion comprises an outer surface, and the nut comprises a fillet there between.

9. The gas turbine engine rotor of claim 8, wherein the recess inner surface, the thread protrusion outer surface, and the fillet are annular.

10. The gas turbine engine rotor of claim 7, wherein the thread protrusion comprises an outer surface tapered radially inward toward the first engaging thread.

11. The gas turbine engine rotor of claim 7, wherein the cylindrical body comprises a larger outside diameter at a body end proximate the load face than at an opposite end of the cylindrical body.

12. A gas turbine engine rotor, comprising: a rotor disk comprising a counterbore and a bolt hole there through; and a nut configured to fit into and protrude from the counterbore; wherein the counterbore is configured to permit limited eccentricity between the bolt hole and the nut, the nut further comprising a load face, a recess from the load face, and a thread protrusion protruding into the recess but not reaching the load face, wherein a first engaging thread and at least two more threads are formed in an inside surface of the thread protrusion, and wherein the recess includes a cantilevered shape including a tapered section forming a conical outer surface of the nut.

13. The gas turbine engine rotor of claim 12, wherein the counterbore is configured to laterally constrain the nut once the limited eccentricity is reached.

14. The gas turbine engine rotor of claim 12, the nut further comprising a load face end, wherein an inner diameter of the counterbore is larger than an outer diameter of the load face end to permit the limited eccentricity.

15. The gas turbine engine rotor of claim 12, the thread protrusion comprising an outer surface that tapers radially inward toward the first engaging thread.

16. The gas turbine engine rotor of claim 12, further comprising a bolt configured to be disposed in the bolt hole, to protrude past the counterbore, and to engage the nut.

17. The gas turbine engine rotor of claim 12, wherein the nut comprises a cylindrical body.

* * * * *